Patented June 15, 1943

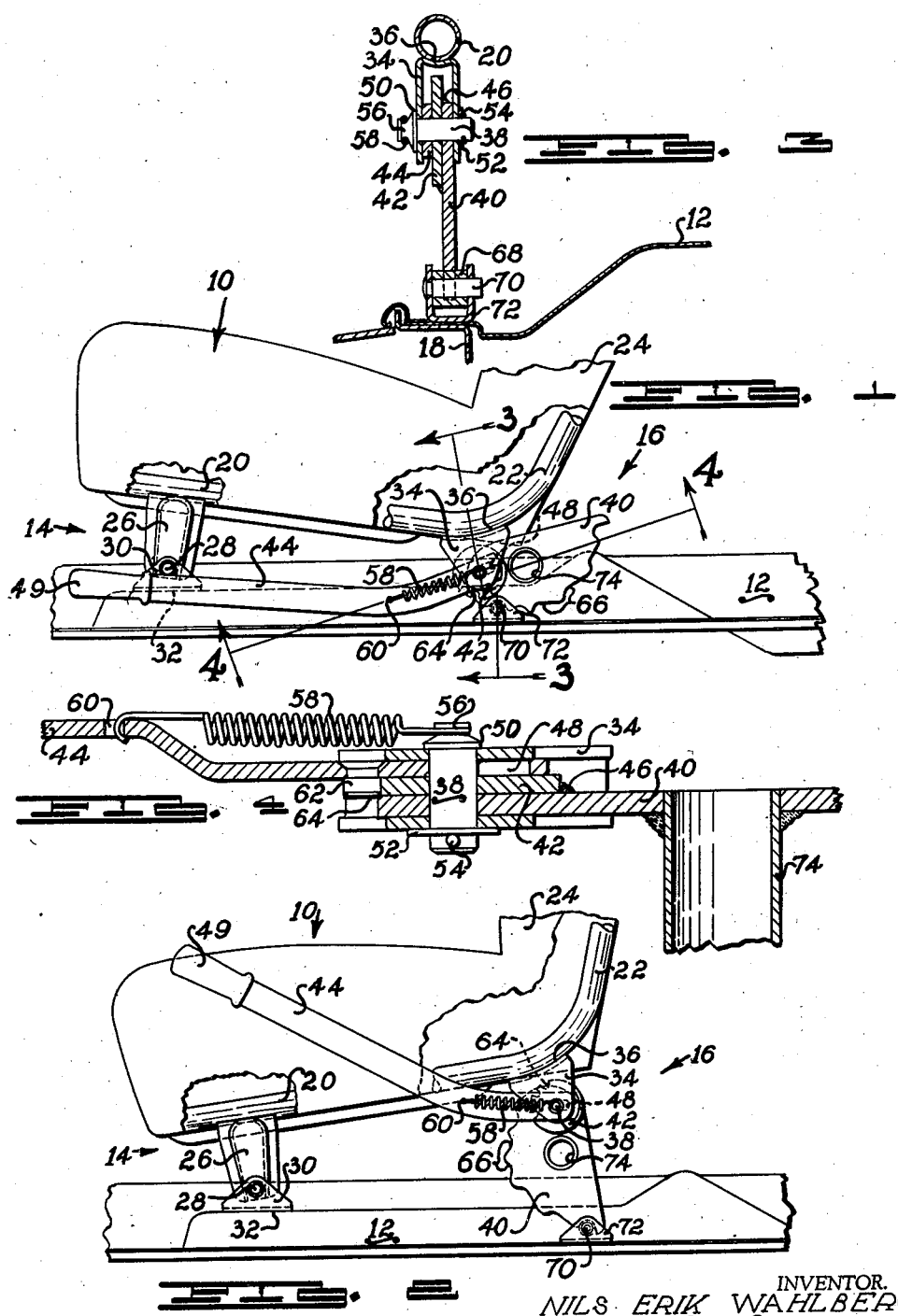

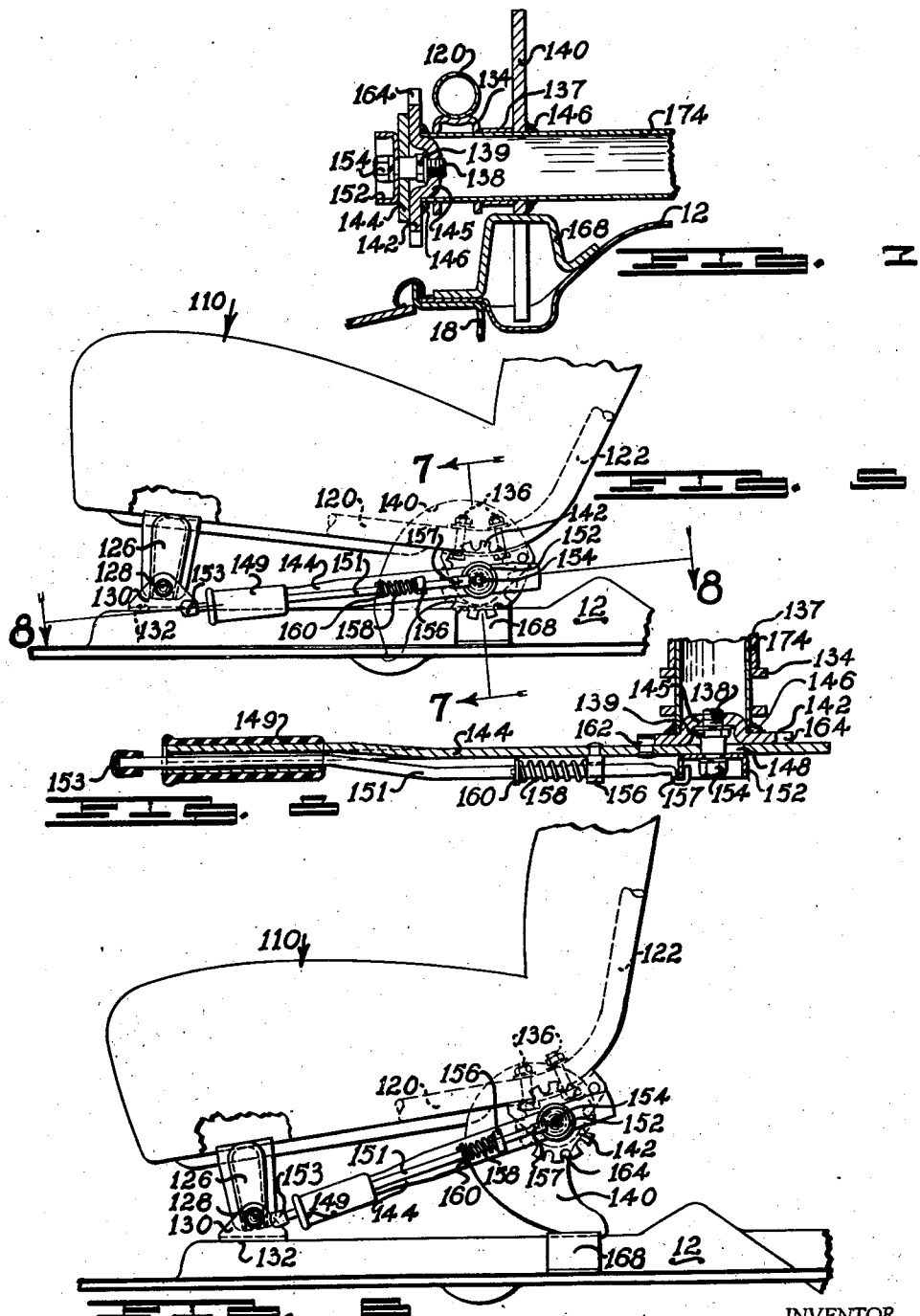

2,321,716

UNITED STATES PATENT OFFICE 2,321,716

ADJUSTABLE SEAT

Nils Erik Wahlberg, Kenosha, Wis., assignor to Nash-Kelvinator Corporation, Kenosha, Wis., a corporation of Maryland Application April 28, 1941, Serial No. 390,663

3 Claims. (Cl. 155—116)

This invention relates to means for adjusting the angular position of a seat and has particular reference to means for tilting the front seat of an automobile.

It is an object of this invention to provide mechanism for adjusting an automobile seat relative to the controls of the automobile to accommodate persons of different size stature by tilting the seat.

It is another object of this invention to provide seat adjusting mechanism which will change the position of the occupant in the automobile without moving the seat along the floor of the automobile.

It is another object of this invention to provide seat adjusting mechanism which may be operated by the occupants of the seat without moving from the seat.

It is another object of this invention to provide seat adjusting mechanism which permits the position of the seat to be changed and which will not slide forward and crush the occupant of the seat in case the automobile is suddenly stopped as in the case of a collision.

It is another object of this invention to provide seat adjusting mechanism which may be inexpensively manufactured and installed in an automobile.

Other objects and advantages of this invention will be apparent from a consideration of the following description and claims and the attached drawings, of which there are two sheets, and in which—

Figure 1 represents a side elevation, partially broken away, of an automobile seat with the adjusting mechanism in lowered position;

Figure 2 represents a side elevation of the seat shown in Figure 1 with the adjusting mechanism shown in raised position;

Figure 3 represents a sectional view taken along a plane indicated by the line 3—3 in Figure 1 and looking in the direction of the arrows;

Figure 4 represents a sectional view taken along a plane indicated by the line 4—4 in Figure 1 and looking in the direction of the arrows;

Figure 5 represents a side elevational view, partially broken away, of an automobile seat and showing a modified type of adjusting mechanism in lowered position;

Figure 6 represents a side elevational view showing the seat in Figure 5 in raised position;

Figure 7 represents a sectional view taken along a plane indicated by the line 7—7 in Figure 5 and looking in the direction of the arrows; and Figure 8 represents a sectional view taken along a plane indicated by the line 8—8 in Figure 5 and looking in the direction of the arrows.

In the past it has been the practice to provide front seats in automobiles which are adjustable by sliding the seat longitudinally of the automobile to accommodate persons of different size stature. These seats have been adjustably arranged by mounting the seat on rollers operating in suitable tracks secured to the floor of the automobile and by providing locking means to hold the seat in any one of several longitudinal positions. This type of seat is subject to the disadvantage that the locking means may become accidentally unlatched, allowing the seat to move along the track when such movement is not desired. This is particularly true in the case of sudden stops or collisions and results in the occupant of the seat being forced against the instrument panel and steering wheel by the weight of the relatively heavy seat.

This invention provides means for pivoting the forward edge of the seat to a fixed point on the floor of the automobile and raising or lowering the back edge of the seat by means of a cam plate bearing on a fixed point secured to the floor of the automobile. By use of the fixed pivot in the front of the seat, it is assured that the seat will not slide forwardly and crush the occupant against the forward part of the automobile and will not slide backwardly making it difficult to reach the controls of the automobile.

The preferred form of the invention illustrated in Figures 1 through 4 shows a seat generally indicated at 10 mounted upon the floor 12 of an automobile by means of a forward pivoted means generally indicated at 14 and an adjustable cam mechanism generally indicated at 16 positioned at the rear edge of the seat. The floor 12 may be rigidly secured to the side rail 18 of the automobile (see Figure 3) in any suitable fashion. The seat 10 may be constructed in any desired manner and is shown in the drawings to be built upon a tubular frame 20 bent up as at 22 to form a support for the back 24 of the seat.

The forward support 14 consists of a strut 26 attached at its upper end to the framework 20 of the seat 10 and pivoted about a pin 28 at its lower end. The pin 28 is supported between the flanges of a generally channel shaped bracket 30, the web of which is secured as by welding to the floor 12 at 32.

The adjusting mechanism 16 for raising and lowering the back edge of the seat 10 consists of a channel shaped bracket 34, the web of which is attached to the framework 22 as at 36 with the flanges thereof extending downwardly. The flanges serve to support the ends of a pivot pin 38 on which is mounted a cam plate 40, ratchet wheel 42 and a forwardly extending lever 44. The ratchet wheel 42 and cam plate 40 are secured together as by welding at 46 so as to rotate in unison. It is immaterial whether the cam plate 40, ratchet wheel 42 and pin 38 rotate together in the bracket 34 or whether the cam plate and wheel rotate on the pin. The lever 44 is free to rotate relative to the pin 38 and is provided with a slot 48 (see Figure 4) so that it may be moved transversely of the pin 38 along the axis of the lever. A handle portion 49 is formed on the forward end of the lever 44. The length of the lever is such that the handle 49 may be conveniently reached by the occupant of the seat.

The pin 38 is provided with a shoulder 50, which rests against the outer side of the bracket 34, and is retained on the inner side of the bracket 34 by a washer 52 and a cotter pin 54. The outer end of the pin 38 is formed into an annular groove 56 which receives the hooked end of a coil spring 58. The forward end of the spring 58 is hooked through an aperture 60 formed in the lever 44 forwardly of the bracket 34 and exerts a full on the lever 44 to maintain the lever in its rearmost position with the pin 38 positioned at the forward end of the slot 48.

The lever 44 is provided with a pin 62 which projects from the lever 44 between the slot 48 and aperture 60. The pin 62 is arranged to engage any one of several notches 64 formed in the periphery of the ratchet wheel 42. It should thus be apparent that by lifting up on the lever 44 with the lever drawn to its rearmost position by the spring 58, the pin 62 will engage one of the notches 64 and rotate the ratchet wheel about the pivot pin 38. The ratchet wheel 46 being welded to the cam plate 40, the cam will also be rotated about the pivot pin 38. By drawing forwardly on the lever 44 against the tension of the spring 58, the pin 62 may be withdrawn from the notch in the rachet wheel in which it is engaged and the lever again rotated about the pin 38 without effecting the ratchet wheel or cam plate. The lever may then be released to allow the spring 58 to draw the lever and pin 62 into engagement with another of the notches 64 in the ratchet wheel 46 to further rotate the ratchet wheel and cam plate. Thus it is unnecessary to swing the lever 44 through as great an angle of rotation as the desired angular rotation of the cam plate. The desired rotation of the ratchet wheel 46 and cam plate 40 may be effected by repeated movement of the lever 44 as just described. It should also be apparent that the lever 44 may be used to rotate the cam plate either forwardly or backwardly.

The cam plate 40 is provided with a cam surface within which a series of notches 66 are formed. The notches 66 are arranged to ride on a roller 68 pivotally supported by a pin 70 carried between the arms of a U-shaped bracket 72. The bracket 72 is secured as by welding to the floor 12 just over the side rail 18. Thus rotation of the cam plate 40 will cause successive notches 66 of the cam plate 40 to come in contact with, and rest upon, the roller 68. The notches 66 are positioned at varying distances from the pivot pin 38 so that the cam plate functions to support the rear edge of the seat at varying distances from the floor 12. The notches 66 form dwell areas on the edge of the cam plate 40 which engage the roller 68 to hold the seat 10 in any desired position. The edges of the notches are, however, rounded off so that the plate may be easily rotated over the roller by movement of the lever 40 to select a new position of the cam. It will be understood that the structure just described with the exception of the lever 44 and ratchet wheel 46 is duplicated on the opposite end of the seat so that both ends of the seat will be raised simultaneously. The cam plates 40 on each end of the seat are rigidly connected by a hollow tube 74 to assure that the cam plates will operate together. The lever 44 is preferably, but not necessarily, mounted at the end of the seat 10 which is to be occupied by the driver of the automobile.

In the modified form of the invention illustrated in Figures 5 through 8, the seat 110 with its supporting framework 120 is supported at the forward edge of the seat by a strut 126 similar to the strut 26 shown in the preferred form of the invention. The strut 126 is pivotally supported by the pin 128 carried by the bracket 130. As in the first form of the invention, the bracket 130 is securely fastened to the floor 12 at 132.

The rear edge of the seat 110 is supported by a cam plate 140, the lower edge of which bears upon and is supported by the U-shaped bracket 168 welded or otherwise suitably secured to the floor 12. The cam plate 140 is rigidly attached as by welding to a tubular member 174 which extends transversely across the automobile to a similar cam plate on the other end of the seat. The tubular member 174 extends through and is rotatably supported at each end of the seat in the flanges of a channel shaped bracket 134, the web of which is secured to the underside of the frame member 120. In this modified form of the invention, the bracket 134 is shown to be secured to the frame by means of bolts 136 passed through the frame and the web of the bracket (see Figures 5 and 6). A spacer sleeve 137 is positioned around the tube 174 between the cam plates 140 and the inner edges of the brackets 134 to locate the tube transversely with respect to the seat 10 and brackets.

A ratchet wheel 142 is rigidly secured to one end of the tubular member 174 as by welding at 146. The center of the ratchet wheel 142 may be stamped to provide a dished portion 145 which projects into the end of the tubular member 174 to center the ratchet wheel on the tube. A shouldered pin 138 has its inner end threaded and secured in a tapped hole in the center of the ratchet wheel and may be secured in place by means of a lock nut 139. The pin 138 serves as a pivot for the lever 144 which is slotted as at 148, the pin being passed through the slot. The lever 144 is retained on the pin 138 by a cup shaped member 152 secured against a shoulder on the outer end of the pin by the nut 154 threaded on the outer end of the pin. The lever 144 carries a pin 162 which extends toward the inner side of the lever and is engageable with any of the notches 164 formed in the ratchet wheel 142.

The lever 144 is provided with a rubber covered, hollow handle portion 149 at its forward end through which extends a release rod 151 provided with a padded tip 153. The release rod 151 extends backwardly along the lever 144 and is journaled in a guide 156 carried by the lever 144. The rear end of the release rod 151 is provided with a hook 157 which engages the edge of the cup shaped member 152. A spring 158 is telescopically mounted around the release rod 151 between the guide 156 and a washer and cotter pin at 160.

The spring 158 tends to force the release rod 151 forwardly relative to the lever 144 but since the release rod is anchored by its hooked end 157, the lever 144 is forced to the rear so that the lever is normally positioned with the pin 138 in the forward end of the slot 148. By grasping the handle portion 149 and placing a thumb over the tip 153, the operator may easily draw the lever 144 forwardly relative to the release rod 151 and the pin 138 to disengage the pin 162 from the notches 164 in the ratchet wheel 142. Thus the lever 144 may be located in any position without effecting the position of the ratchet wheel 142 and the cam plate 140. By allowing the lever 144 to be drawn backwardly by the spring 158, the pin 162 may be engaged with the ratchet wheel so that rotation of the lever 144 will rotate the ratchet wheel and the tubular member 174. Since the cam plate 140 is carried by the tubular member 174, rotation of the lever will cause the cam plate to rotate and assume a different position on the bracket 168.

The cam surface of the plate 140 is arranged to engage the bracket 168 at varying distances from the pin 138 and thus raise or lower the rear edge of the seat with respect to the floor 12. It will be noted that the edge of the cam plate 140 is smooth rather than notched as in the first form of the invention. While the notches are desirable, they are not strictly necessary since the friction between the edge of the cam plate and the bracket is sufficient to retain the cam plate in position. The regular edge of the cam plate 140 also allows a greater variety of positions of the cam plate and the seat. Attention is called to the fact that the bracket 168 on which the cam plate 140 rests is positioned along the arc generated by the pivot pin 138 as it swings about the front pivot 128. Thus the weight carried by the cam 140 is applied along a line through the pin 138 and the bracket 168 so that there is no force tending to rotate the cam out of its adjusted position.

In operation, the modified form of the invention is similar to the operation of the first form of the invention in that the cam plate may be rotated to any one of several positions by movement of the lever 144 and the seat will be adjusted accordingly. The lever 144 is engageable with the ratchet wheel in a plurality of positions so that the ratchet wheel may be rotated through a considerable angle by several short angular movements of the lever 144.

It should thus be apparent that in each form of the invention the seat will be securely fastened to the floor at the pivots 28 and 128 so that the seat cannot move forwardly or backwardly relative to the floor. The desired adjustment of the position of the operator of the automobile is obtained by tilting the seat rather than sliding the seat. With the seat tipped backwardly, the occupant of the seat will find his shoulders and arms moved backwardly from the steering wheel and his feet moved backwardly from the foot pedals of the automobile. The adjustment of the seat thus allows both persons of long and short stature to occupy the seat and reach the controls of the automobile conveniently. Tilting the seat also relieves the monotony of sitting in one position for a long time as on long drives.

While I have described my invention in some detail, I intend this description to be an example only and not as a limitation of my invention, to which I make the following claims:

1. In combination with a base, a seat having a pivotal support on said base on a line along one edge of said seat, a pair of brackets carried by said seat at the opposite edge thereof from said pivotal support, pins carried by said brackets, cam plates supported by said pins, said cam plates having notched edges, a bar extending between said cam plates and rigidly secured thereto, a ratchet wheel secured to one of said cam plates and concentric with said pin, a lever pivotally supported by said pin and defining a slot through which said pin extends, another pin carried by said lever and engageable with said ratchet wheel, spring means urging said lever and said other pin into engagement with said ratchet wheel, and rollers mounted on said base arranged to engage the notched edges of said cam plates in a plurality of positions.

2. In combination with a base, a seat having a pivotal support on said base along one edge of said seat, brackets carried by said seat at the opposite edge thereof from said pivotal support, a transverse bar journaled in said brackets, cam plates secured to said bar and engageable in a plurality of positions along said cam plates with fixed points on said base, a ratchet wheel secured to one end of said bar and having a pin extending from the center thereof, a lever having a slot in one end positioned over said pin, a second pin carried by said lever and engageable with said ratchet wheel, and spring means urging said lever and pin into engagement with said ratchet wheel, the distance between said pivotal support and said bar being equal to the distance between said fixed points and said pivotal support.

3. In combination with a base, a seat having a pivotal support on said base along one edge of said seat, transversely aligned brackets carried by said seat along the opposite edge thereof from said pivotal support, a transverse bar pivotally supported in said brackets, cam plates secured to said bar and arranged to engage portions of said base in a plurality of positions, a ratchet wheel secured to one end of said bar and having a pin extending from the center thereof, a lever defining a slot in one end thereof, said lever being supported with said pin in said slot, a retaining member secured to the end of said pin and retaining said lever between itself and said ratchet wheel, a second pin carried by said lever and engageable with said ratchet wheel, a release bar slideably supported relative to said lever and anchored to said retaining member, a spring carried by said release bar and engaging a portion of said lever to urge said lever to engage said ratchet wheel, and a handle portion for said lever arranged adjacent to the end of said release bar.

NILS ERIK WAHLBERG.